(12) United States Patent
Egami (10) Patent No.: US 8,208,108 B2
(45) Date of Patent: Jun. 26, 2012

(54) ELECTRO-OPTIC DEVICE AND ELECTRONIC APPARATUS

(75) Inventor: Takafumi Egami, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 771 days.

(21) Appl. No.: 12/199,934

(22) Filed: Aug. 28, 2008

(65) Prior Publication Data

US 2009/0056990 A1    Mar. 5, 2009

(30) Foreign Application Priority Data

Aug. 31, 2007   (JP) ................. 2007-225317

(51) Int. Cl.
*G02F 1/1343* (2006.01)
*G02F 1/136* (2006.01)
(52) U.S. Cl. .......................... 349/139; 349/43
(58) Field of Classification Search .................... 349/38, 349/39, 43, 44, 113, 139
See application file for complete search history.

(56) References Cited

U.S. PATENT DOCUMENTS

| | | | | |
|---|---|---|---|---|
| 6,327,006 | B1 * | 12/2001 | Sato et al. ................... | 349/44 |
| 6,768,522 | B2 * | 7/2004 | Yasukawa et al. ............ | 349/43 |
| 2002/0047950 | A1 * | 4/2002 | Fujikawa et al. ............. | 349/43 |
| 2004/0135952 | A1 * | 7/2004 | Kurashina et al. ............ | 349/139 |
| 2004/0141130 | A1 * | 7/2004 | Kawata et al. ............... | 349/139 |
| 2004/0263742 | A1 * | 12/2004 | Kim ............................ | 349/139 |
| 2005/0270433 | A1 * | 12/2005 | Ohue et al. ................... | 349/38 |

FOREIGN PATENT DOCUMENTS

JP    2005-242296    9/2005

* cited by examiner

*Primary Examiner* — Richard Kim
*Assistant Examiner* — David Chung
(74) *Attorney, Agent, or Firm* — Maschoff Gilmore & Israelsen (57) ABSTRACT

An electro-optic device includes a pixel electrode, an insulating film, a first conductive film, and a second conductive film. The second conductive film that is formed between the pixel electrode and the insulating film and formed in an island shape so as to overlap with a contact hole formed in the insulating film.

5 Claims, 9 Drawing Sheets

ELECTRO-OPTIC DEVICE AND ELECTRONIC APPARATUS

BACKGROUND

1. Technical Field

The present invention relates to an electro-optic device such as a liquid crystal device, a method of manufacturing the electro-optical device, and an electronic apparatus such as a liquid crystal projector including the electro-optic device.

2. Related Art

Such an electro-optic device includes pixel electrodes, scanning lines and data lines used to selectively drive the pixel electrodes, and TFTs (Thin Film Transistor) as pixel switching elements on a substrate. In addition, the electro-optic device is configured to enable active-matrix driving. On the substrate, a laminated structure in which various functional films such as a conductive film or a semiconductor film forming the scanning lines, the data lines, the TFTs, and the like are laminated are formed in each of pixels. In the laminated structure, pixel electrodes are disposed on the uppermost layer, for example.

The pixel electrodes are generally formed of an ITO (Indium Tin Oxide) film and electrically connected to a conductive film formed of, for example, aluminum and disposed in a lower layer through contact holes formed in an interlayer insulating film. In this case, when the pixel electrodes formed of, for example, an ITO film and the conductive film formed of, for example, aluminum are directly connected to each other, electrolytic corrosion, which is a phenomenon occurring when the pixel electrodes formed of an ITO film and the like turn dark, may occur in the pixel electrodes formed of, for example, an ITO film since current flows between the pixel electrodes and the conductive film due to an alkaline removing liquid used in a patterning process of a manufacture process.

In order to solve the problem, JP-A-2005-242296 discloses a technique for preventing the above-described electrolytic corrosion by providing an electrolytic corrosion preventing film formed of, for example, titanium nitride between the pixel electrodes and the conductive film in a laminated structure. In addition, JP-A-2005-242296 discloses a technique for suppressing heat generation caused due to a high light-absorbing ratio of the electrolytic corrosion preventing film formed of, for example, titanium nitride, by providing the electrolytic corrosion preventing film formed of, for example, titanium nitride only in a region where the pixel electrodes on the conductive film and the contact holes for connecting the conductive film are formed.

However, in the technique disclosed in JP-A-2005-242296, the electrolytic corrosion preventing film formed of, for example, titanium nitride has to be subjected to a patterning process by, for example, etching the conductive film formed of, for example, aluminum. At this time, when an etching selection ratio between the electrolytic corrosion preventing film and the conductive film during the etching is low, the etching selection ratio has to be increased by using a mixed gas of carbon fluoride and oxygen. However, when the mixed gas of carbon fluoride and oxygen is used, an isotropic etching process has to be performed on the electrolytic corrosion preventing film. Accordingly, it is difficult to perform a precise patterning process on the electrolytic corrosion preventing film. Therefore, there occurs a technical problem in that the above-mentioned electrolytic corrosion occurs since the electrolytic corrosion preventing film is subjected to an unnecessary etching process and the pixel electrodes and the conductive film are directly connected to each other.

SUMMARY

An advantage of some aspects of the invention is that it provides an electro-optic device, a method of manufacturing the electro-optic device capable of preventing occurrence of electrolytic correction and suppress heat generation to display a high-quality image, and an electronic apparatus including the electro-optic device.

According to an aspect of the invention, there is provided an electro-optic device including: on a substrate, a plurality of pixel electrodes; an insulating film which is provided as a ground of the pixel electrodes; a first conductive film which is electrically connected to the pixel electrodes through contact holes formed in the insulating film; and a second conductive film which is formed below the pixel electrodes and above the insulating film in an island shape so as to overlap with the contact holes in plan view from the substrate.

According to the electro-optic device having the above-described configuration, for example, liquid crystal elements, which are displaying elements, can display an image on a display area (that is, a pixel area in which the plurality of pixel electrodes are arranged) on the basis of a supplied image signal by supplying the image signal to the pixel electrodes, for example.

The plurality of pixel electrodes are each formed of a transparent conductive film such as an ITO film.

The first conductive film is formed below the plurality of pixel electrodes through the insulating film, electrically connected to the plurality of pixel electrodes through the contact holes formed in the insulating film, and provided as one wiring, a part of the electrodes, or the entire electrodes for driving the plurality of pixel electrodes. That is, the first conductive film is formed as the data lines or the scanning lines electrically connected to the plurality of pixel electrodes through the TFTs for switching the plurality of pixel electrodes, or as the capacitor electrodes forming the storage capacitors electrically connected to the pixel electrodes.

In particular, the second conductive film is formed below the pixel electrodes and above the insulating film so as to overlap with the contact holes in the island shape in plan view from the substrate. Accordingly, the pixel electrodes and the first conductive film are electrically connected to each other through the second conductive film without direction connection (or contact). That is, the pixel electrodes and the first conductive film are electrically connected in the contact holes by directly connecting the pixel electrodes to the second conductive film and directly connecting the second conductive film to the first conductive film with the contact holes. Accordingly, the can second conductive film can reduce or prevent occurrence of electrolytic corrosion caused due to the direction connection between the pixel electrodes and the first conductive film. That is, the second conductive film can function as an electrolytic corrosion preventing film for reducing or preventing the occurrence of electrolytic corrosion between the pixel electrodes and the first conductive film.

Since the second conductive film is formed so as to overlap with the contact holes in the island shape, it is possible to suppress heat generation caused due to light incident on the second conductive film, compared to a case where the second conductive film is formed so as to overlap with the entire first conductive film.

Electrolytic corrosion may occur due to the direct connection between the pixel electrodes and the first conductive film one another when the second conductive film is subjected to a patterning process by, for example, etching the second conductive film on the insulating film and the second conductive film is subjected to an unnecessary etching process in a manufacturing process. However, in the electro-optic device having the above-described configuration, it is possible to reduce or prevent the occurrence of electrolytic corrosion between the pixel electrodes and the first conductive film, since the second conductive film is formed below the pixel electrodes and above the insulating film.

If the second conductive film is formed below the insulating film and the contact holes are formed by, for example, etching the insulating film after the second conductive film is formed in the manufacturing process, the second conductive film may be excessively etched. Accordingly, in order to prevent the etching up to the first conductive film, the thickness of the second conductive film has to be relatively large.

However, in the electro-optic device having the above-described configuration, the contact holes for electrically connecting the pixel electrodes to the first conductive film is formed by, for example, etching the insulating film in the manufacturing process before the second conductive film is formed, since the second conductive film is formed below the pixel electrodes and above the insulating film. Accordingly, the thickness of the second conductive film can be made small, compared to a case where the second conductive film is formed below the insulating film. As a result, it is possible to further suppress the heat generation caused due to the light incident on the second conductive film.

As described above, the electro-optic device having the above-described configuration is capable of preventing the occurrence of electrolytic corrosion between the pixel electrodes and the first conductive film and suppressing the heat generation caused due to the light incident on the second conductive film. Accordingly, a high-quality image can be displayed.

In the electro-optic device having the above-described configuration, the second conductive film may be formed of a material containing at least one of tungsten, tungsten silicon, titanium nitride, and titanium.

According to the electro-optic device, the second conductive film can function more reliably as the electrolytic corrosion preventing film for reducing or preventing the occurrence of electrolytic corrosion between the pixel electrodes and the first conductive film.

In the electro-optic device having the above-described configuration, the pixel electrode may be formed of an ITO film, and the first conductive film may be formed of a material containing aluminum.

The electrolytic corrosion may occur due to an alkaline removing liquid used in a patterning process on the pixel electrodes formed of the ITO film. However, according to the electro-optic device, it is possible to reduce or prevent the occurrence of electrolytic corrosion between the pixel electrodes formed of the ITO film and the first conductive film formed of the material containing aluminum.

In the electro-optic device having the above-described configuration, the second conductive film may include a body portion formed in an inner surface of the contact hole and an extension portion extending outside the contact hole from the body portion.

According to the electro-optic device, it is possible to prevent the direct connection between the pixel electrodes and the first conductive film caused due to the unnecessary etching process on the body portion of the second conductive film. Accordingly, it is possible to reliably reduce or prevent the occurrence of electrolytic corrosion between the pixel electrodes and the first conductive film.

According to another aspect of the invention, there is provided an electronic apparatus including the electro-optic device having the above-described configuration.

Since the electronic apparatus includes the electro-optic device having the above-described configuration, it is possible to embody various electronic apparatuses such as a projection type display apparatus, a television, a cellular phone, an electronic pocket book, a word processor, a view finder type or monitor direct vision-type video tape recorder, a workstation, a television phone, a POS terminal, and a touch panel capable of displaying a high-quality image. Moreover, as the electronic apparatus having the above-described configuration, an electrophoresis apparatus such as electronic paper, an electronic emission apparatus (field emission display and conduction electron-emitter display) and a display device using them can be realized.

According to still another aspect of the invention, there is provided a method of manufacturing an electro-optic device, which includes: forming a first conductive film on a substrate; forming an insulating film above the first conductive film; forming contact holes connected to the first conductive film in the insulating film; forming a second conductive film above the insulating film in an island shape in plan view from the substrate so as to overlap with the contact holes; and forming a plurality of pixel electrodes above the second conductive film so as to be electrically connected to the first conductive film through the contact holes.

According to the electro-optic device manufacturing method described above, the electro-optic device having the above-described configuration can be manufactured. In particular, it is possible to prevent the occurrence of electrolytic corrosion between the pixel electrodes and the first conductive film and suppress the heat generation caused due to the light incident on the second conductive film, since the second conductive film is formed above the insulating film so as to overlap with the contact holes formed in the insulating film in the island shape in plan view from the substrate. Moreover, it is possible to easily perform a patterning process on the second conductive film with high precision.

In the electro-optic device manufacturing method described above, a wiring pattern or various electronic elements of a plurality of electro-optic devices may be formed on a mother substrate (a large-scale substrate) on which a plurality of liquid crystal devices are formed, and then the mother substrate may be cut and divided into individual substrates. According to the electro-optic device having the above-described configuration, the second conductive film can be formed so as to be almost or entirely uniform at a center portion of the mother substrate and the periphery of the mother substrate, when such a mother substrate is used. That is, it is possible to perform the patterning process on the second conductive film with high precision on the mother substrate (in other words, it is possible to reduce non-uniformity of a pattern of a plurality of second conductive films.

In the above-described electro-optic device manufacturing method, the forming of the second conductive film may be performed to form the second conductive film by forming a precursor film of the second conductive film on the insulating film, and then etching at least a part of a portion other than a portion overlapping with each of the contact holes.

According to electro-optic device manufacturing method, a precursor film of the second conductive film formed of a titanium nitride film is formed on the entire surface of the insulating film by, for example, a CVD (Chemical Vapor Deposition) method or a plasma CVD method. Subsequently, the second conductive film is formed by removing the part of the portion other than the portion overlapping with each of the contact holes from the precursor film by performing an etching process such as a photolithography method.

An operation and other advantages are apparent from an exemplary embodiment described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

An electro-optic device, a method of manufacturing the electro-optic device, and an electronic apparatus according to an exemplary embodiment of the invention will be described with reference to the drawings. In the embodiments, a TFT active matrix driving-type liquid crystal device having a driving circuit therein will be described as an example of an electro-optic device.

First Embodiment

Figure 1:
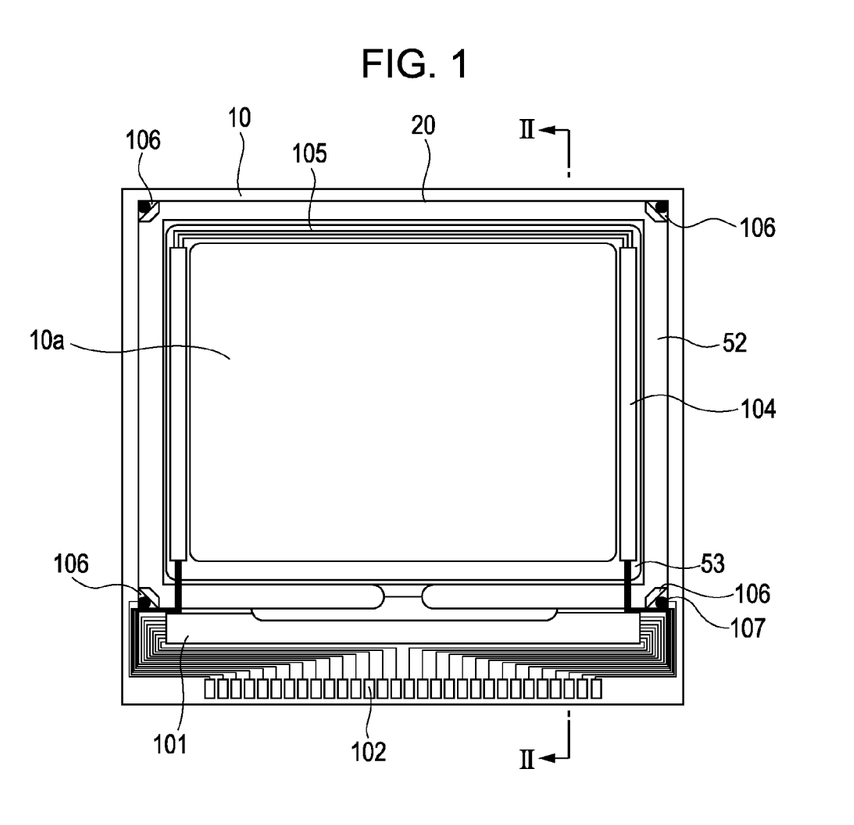
FIG. 1 is a plan view illustrating an overall configuration of a liquid crystal device according to a first embodiment.
Figure 2:
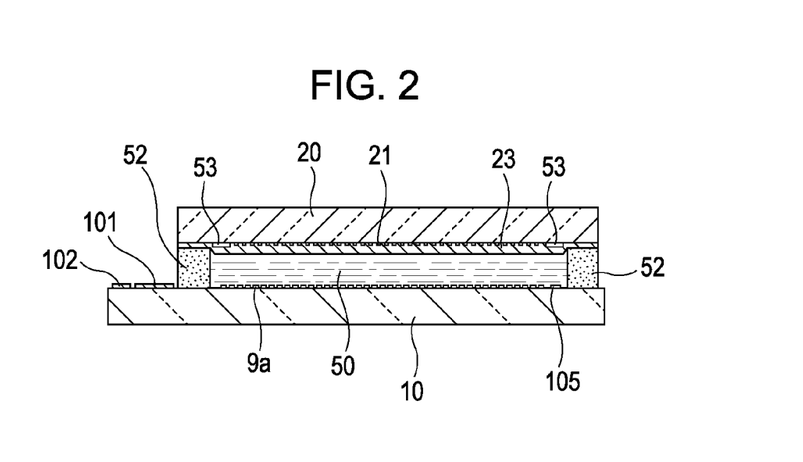
FIG. 2 is a section view taken along the line II-II of FIG. 1.

First, according to this embodiment, an overall configuration of the liquid crystal device will be described with reference to FIGS. 1 and 2. FIG. 1 is a plan view illustrating constituent elements formed on a TFT array substrate of the liquid crystal device when viewed from a counter substrate. FIG. 2 is a sectional view taken along the line II-II of FIG. 1.

In FIGS. 1 and 2, in the liquid crystal device according to the embodiment, a TFT array substrate 10 and a counter substrate 20 are disposed so as to face with each other. The TFT array substrate 10 is a transparent substrate such as a quartz substrate, a glass substrate, or a silicon substrate. The counter substrate 20 is also the same transparent substrate of the TFT array substrate 10. A liquid crystal layer 50 is interposed between the TFT array substrate 10 and the counter substrate 20. The TFT array substrate 10 and the counter substrate 20 are adhered to each other by a seal member 52 which is provided in a seal area located in the periphery of an image display area 10a on which a plurality of pixel electrodes are formed.

In order to adhere both the substrates one another, the seal member 52 made of an ultraviolet curable resin, a thermoset resin, or the like is applied on the TFT array substrate 10 and cured by ultraviolet irradiating, heating, or the like in a manufacturing process. In the seal member 52, there are sprayed gap members such as glass fibers or glass beads for spacing a predetermined gap (that is, an inter-substrate gap) between the TFT array substrate 10 and the counter substrate 20. The liquid crystal device according to the invention is appropriate for a small light valve of a projector to magnify an image.

Inside the seal area where the seal member 52 is provided, a frame light-shielding film 53 which defines a frame area of the image display area 10a is formed on the counter substrate 20. Moreover, a part or the whole of the frame light-shielding film 53 may be provided as a light-shielding film mounted in the TFT array substrate 10.

In a peripheral area outside the seal area where the seal member 52 is provided, a data line driving circuit 101 and external circuit connecting terminals 102 are provided along one side of the TFT array substrate 10. Scanning line driving circuits 104 are provided along two sides adjacent to the one side so as to be covered with the frame light-shielding film 53. In order to connect the two scanning line driving circuits 104 one another provided in both the sides of the image display area 10a, a plurality of wirings 105 are provided along the remaining one side of the TFT array substrate 10 so as to be covered with the frame light-shielding film 53.

On the TFT array substrate 10, vertical conductive terminals 106 for allowing vertical conductive members 107 to connect both the substrates one another are disposed in areas facing four corners of the counter substrate 20. With such a configuration, the TFT array substrate 10 and the counter substrate 20 can be electrically connected to each other.

In FIG. 2, on the TFT array substrate 10, an alignment film is formed on pixel electrodes 9a after pixel switching TFTs and wirings such as scanning lines and data lines are formed. The pixel electrodes 9a are formed of an ITO film and the alignment film is formed of an organic film such as a polyimide film. On the counter substrate 20, a light-shielding film 23 having a lattice shape or stripe shape is formed, counter electrodes 21 are formed on the entire surface of the counter substrate 20, and an alignment film is formed in an uppermost layer. The counter electrode 21 is formed an ITO film and the alignment film is formed of an organic film such as a polyimide film. With such a configuration, a liquid crystal layer 50 is interposed between the TFT array substrate 10 and the counter substrate 20 disposed so that the pixel electrodes 9a and the counter electrodes 21 are faced with each other. The liquid crystal layer 50 is formed of, for example, liquid crystal in which one or more nematic liquid crystal materials are mixed, and takes a predetermined alignment state between the pair of the alignment films.

On the TFT array substrate 10 shown in FIGS. 1 and 2, as well as the driving circuits such as the data line driving circuit 101 and the scanning line driving circuit 104, there may be formed a sampling circuit which samples an image signal of image signal lines and supplies the image signal to the data lines, a pre-charge circuit which supplies a pre-charge signal having a predetermined voltage level to the plurality of data lines prior to the image signal, and an inspection circuit which inspects the quality or defect of the electro-optic device in manufacturing or shipping the electro-optic device.

Figure 3:
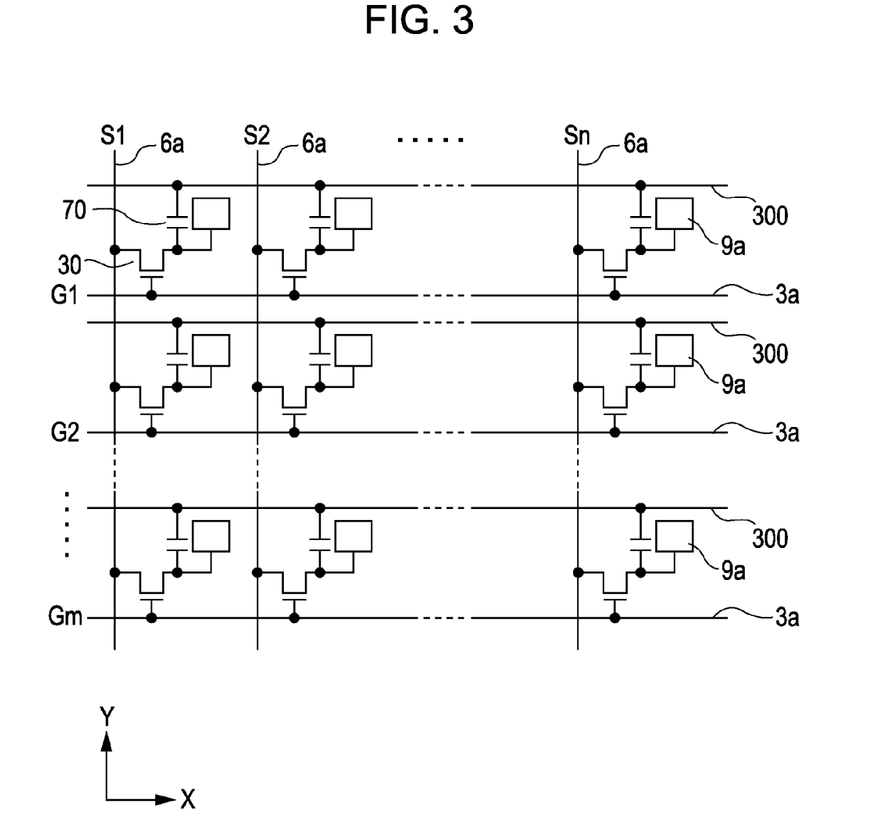
FIG. 3 is an equivalent circuit diagram illustrating a plurality of pixels of the liquid crystal device according to the first embodiment.

Next, according to the invention, an electrical configuration of pixels of the liquid crystal device will be described with reference to FIG. 3. FIG. 3 is an equivalent circuit diagram illustrating various elements, wirings, and the like of the plurality of pixels which are formed in a matrix shape and constitute the image display area of the liquid crystal device according to this embodiment.

In FIG. 3, the pixel electrode 9a and the TFT 30 are formed in each of the plurality of pixels which are formed in the matrix shape and constitute the image display area 10a. The TFT 30 which is electrically connected to the pixel electrode 9a switches the pixel electrode 9a when the liquid crystal device according to this embodiment operates. Each of data lines 6a supplied with the image signal electrically connected to a source of the TFT 30. Image signals S1, S2, . . . , Sn which are input to the data lines 6a may be supplied in such a sequence and may be supplied to a group of the plurality of data lines 6a adjacent to each other.

Each of the scanning lines 3a are electrically connected to a gate of each of the TFTs 30. According to the invention, the liquid crystal device sequentially applies scanning lines G1, G2, . . . , Gm in a pulse form to the scanning lines 3a in such a sequence at predetermined timing. Each of the pixel electrodes 9a is electrically connected to a drain of each of the TFTs 30. The image signals S1, S2, . . . , Sn supplied from the data lines 6a are input at predetermined timing by turning on the TFTs 30, which are a switch element, only for some time. The image signals S1, S2, . . . , Sn having a predetermined level input to the liquid crystal, which is an example of an electro-optic substance, through the pixel electrodes 9a are maintained for some time in the counter electrodes formed in the counter substrate.

The liquid crystal of the liquid crystal layer 50 (see FIG. 2) makes it possible to display gray scale, by modulating light on the basis of the fact that alignment or order of molecule set of liquid crystal varies depending on a level of application voltage. In a normally white mode, the transmissivity of incident light decreases with the application of voltage in a unit of the pixels. In a normally black mode, the transmissivity of incident light increases with the application of voltage in a unit of the pixels. As a whole, light having contrasts corresponding to the image signals is emitted from the liquid crystal device.

In order to prevent the image signal from leaking, a storage capacitor 70 is disposed in parallel with a liquid crystal capacitor formed between the pixel electrode 9a and the counter electrode 21 (see FIG. 2). The storage capacitor 70 is a capacitance element which functions as a maintaining capacitance for temporarily maintaining a potential of the pixel electrode 9a in accordance with the supply of the image signal. One electrode of the storage capacitor 70 is connected to the drain of the TFT 30 in parallel with the pixel electrode 9a. The other electrode of the storage capacitor 70 is connected to a potential fixing capacitor line 300 to become a constant potential. The storage capacitor 70 improves a potential holding characteristic in the pixel electrode 9a and a display characteristic is improved, thereby improving a contrast ratio or reducing flickering.

Figure 4:
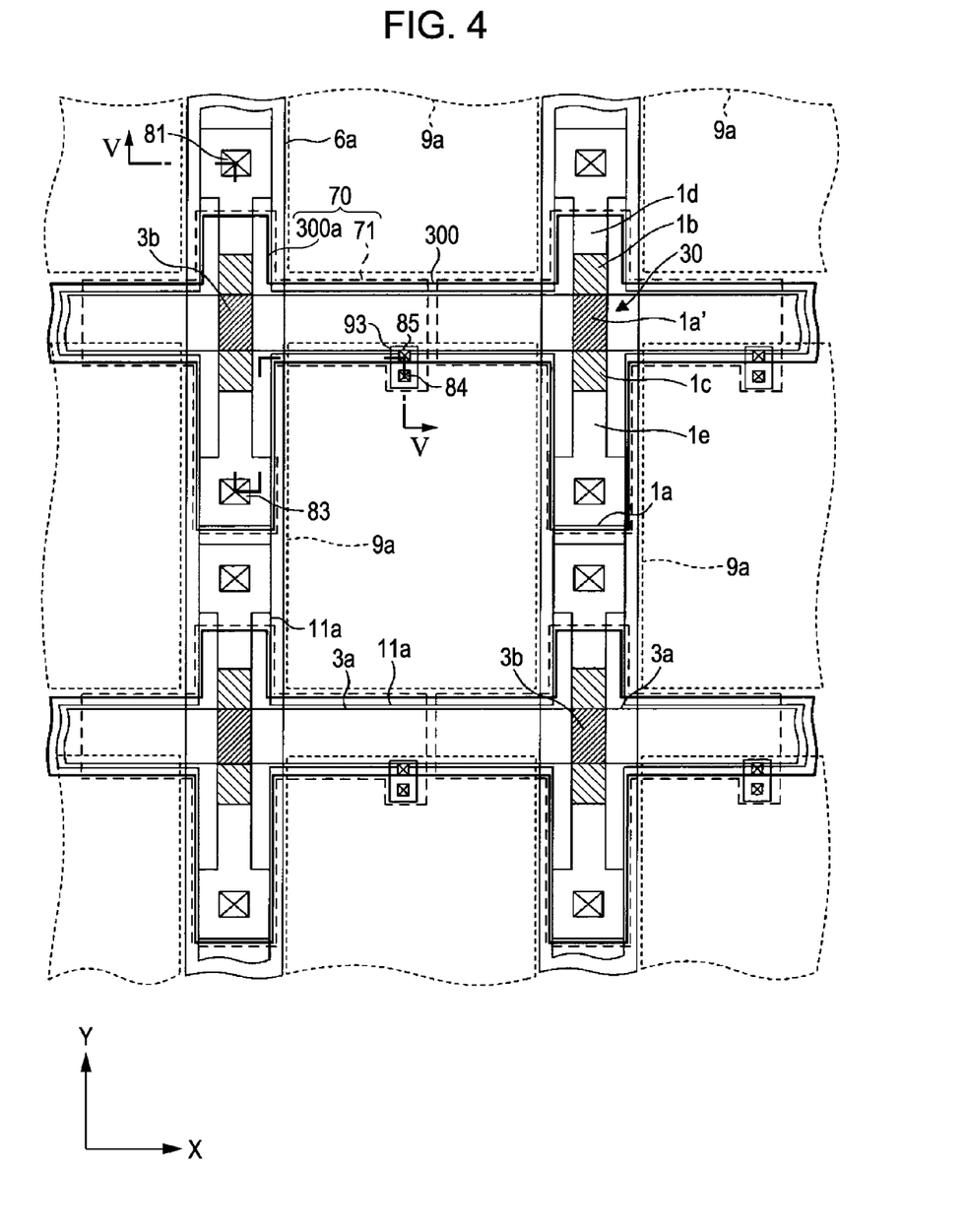
FIG. 4 is a plan view illustrating the plurality of pixels of the liquid crystal device according to the first embodiment.
Figure 5:
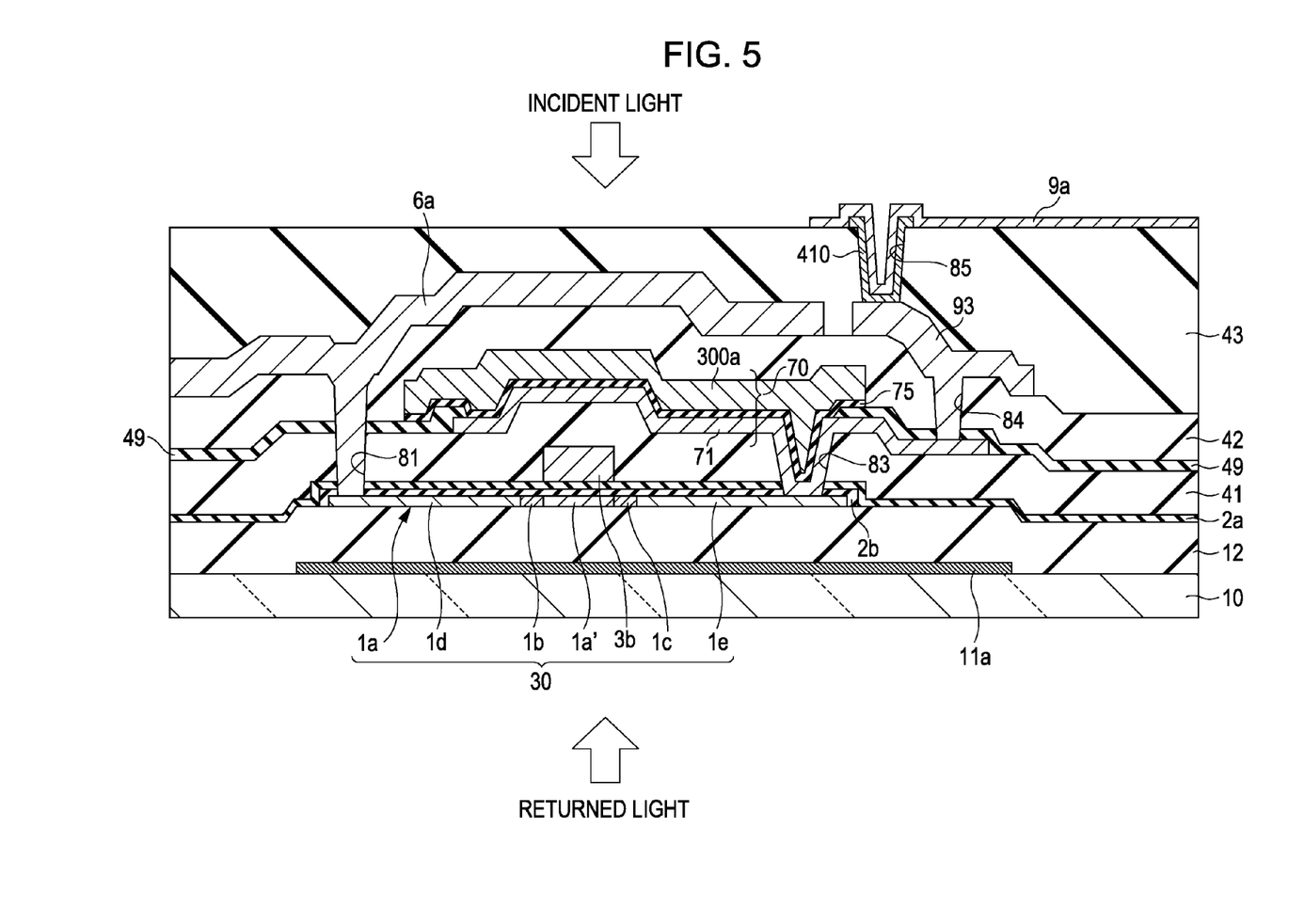
FIG. 5 is a sectional view taken along the line V-V of FIG. 4.

Next, a specific configuration of the pixels realizing the above-described operation will be described with reference to FIGS. 4 and 5. FIG. 4 is a plan view illustrating the plurality of pixels adjacent to each other. FIG. 5 is a sectional view taken along the line V-V of FIG. 4. In addition, in FIGS. 4 and 5, layers and elements are expressed in different scales so as to allow the layers and the elements to be visible in the figures. In FIGS. 4 and 5, portions located above the pixel electrodes 9a are not illustrated for convenient explanation.

In FIG. 4, the plurality of pixel electrodes 9a are formed on the TFT array substrate 10 in a matrix shape. The data lines 6a and the scanning lines 3a are formed along the length and breadth boundaries of the pixel electrodes 9a. That is, the scanning lines 3a extend in an X direction, and the data lines 6a extend in a Y direction to intersect the scanning lines 3a.

The pixel switching TFT 30 is formed at each of intersections of the scanning lines 3a and the data lines 6a.

The scanning lines 3a, the data lines 6a, the storage capacitors 70, lower light-shielding films 11a, relay layers 93, and the TFTs 30 are disposed in a non-opening area surrounding an opening area (that is, an area where light factually contributes to displaying an image in the pixels) of the pixels corresponding to each of the pixel electrodes 9a in plan view from the TFT array substrate 10. That is, the scanning lines 3a, the data lines 6a, the storage capacitors 70, the relay layers 93, the lower light-shielding films 11a, and the TFTs 30 are disposed not in the opening area of each pixel but in the non-opening area so as not to intervene the displaying. Moreover, the relay layer 93 is an example of "a first conductive film" according to the invention.

In FIGS. 4 and 5, the TFT 30 includes a semiconductor layer 1a and a gate electrode 3b formed as a part of the scanning line 3a.

The semiconductor layer 1a formed of, for example, polysilicon includes a channel region 1a' having a channel length in the Y direction, an data line side LDD region 1b, an pixel electrode side LDD region 1c, a data line side source drain region 1d, and a pixel electrode side source drain region 1e. That is, the TFT 30 has an LDD structure.

The data line side source drain region 1d and the pixel electrode side source drain region 1e are formed in a substantial mirror symmetrical shape in the Y direction with reference to the channel area 1a'. The data line side LDD region 1b is formed between the channel region 1a' and the source drain region 1d close to data line. The pixel electrode side LDD region 1c is formed between the channel region 1a' and the pixel electrode side source drain region 1e. The data line side LDD region 1b, the pixel electrode side LDD region 1c, the data line side source drain region 1d, and the pixel electrode side source drain region 1e are impurity regions which are formed by implanting impurities into the semiconductor layer 1a using an impurity implanting process such as an ion implantation technique. The data line side LDD region 1b and the pixel electrode side LDD region 1c are the impurity regions which have a lower impurity concentration than the source drain region 1d close the data line and the pixel electrode side source drain region 1e. In such impurity areas, it is possible to reduce off-current flowing between the source region and the drain region when the TFT 30 does not operate and it is possible to suppress reduction in on-current flowing when the TFT 30 operates. It is preferable that the TFT 30 has the LDD structure. However, the TFT 30 may have an offset structure in which impurities are not implanted into the data line side LDD region 1b and the pixel electrode side LDD region 1c, or a self-aligned structure in which the source drain region close to the data line and the source drain region close to the pixel electrode are formed by implanting impurities with a high concentration using the gate electrode as a mask.

In FIGS. 4 and 5, the gate electrode 3b is formed as a part of the scanning line 3a and formed of conductive polysilicon, for example. The scanning lines 3a extend in the X direction. A portion of each of the scanning lines 3a overlapping with the channel region 1a' functions as the gate electrode 3b. The gate electrode 3b and the semiconductor layer 1a are insulated by a gate insulating film 2 (specifically, insulating films 2a and 2b).

In FIGS. 4 and 5, each of the lower light-shielding films 11a is formed in a lattice shape below the TFT 30 on the TFT array substrate 10 with a ground insulating film 12 interposed therebetween. The lower light-shielding film 11a is made of a light-shielding material such as signal metal, alloy, metal silicide, or poly silicide containing at least one of high melting-point metals such as Ti (titanium), Cr (chromium), W (tungsten), Ta (tantalum), Mo (molybdenum), Pd (palladium), or a laminate thereof. The lower light-shielding film 11a shields the channel region 1a' of the TFT 30 and the periphery thereof from returned light, which reflects from the back side of the TFT array substrate 10 or emits from another liquid crystal device to a multi-plate type projector or the like to penetrate through a synthetic optical system, incident from the TFT array substrate 10 to the device.

In FIG. 5, the ground insulating film 12 has a function of insulating the lower light-shielding film 11a and the TFT 30, and a function of preventing degradation of the characteristics of the pixel switching TFT 30 which may be caused due to roughness at the time of grinding a surface of the TFT array substrate 10 or contamination remaining after cleaning, or the like since the ground insulating film 12 is formed on the entire surface of the TFT array substrate 10.

In FIG. 5, the storage capacitor 70 is formed above the TFT 30 on the TFT array substrate 10 with a first interlayer insulating film 41 interposed therebetween.

The storage capacitor 70 is formed by facing a lower capacitor electrode 71 and an upper capacitor electrode 300a one another with a dielectric film 75 interposed therebetween.

The upper capacitor electrode 300a is formed as a part of the capacitor line 300. The capacitor line 300 extends from the image display area 10a, where the pixel electrode 9a is disposed, to its periphery. The upper capacitor electrode 300a is electrically connected to a constant potential source through the capacitor line 300 and is a fixed potential side capacitor electrode having a fixed potential. The upper capacitor electrode 300a is formed of a non-transparent metal film containing, for example, metal such as Al (aluminum) and Ag (silver) or alloy and functions as an upper light-shielding film (built-in light-shielding film) which shields the TFT 30 from light. For example, the upper capacitor electrode 300a may be made of single metal, alloy, metal silicide, poly silicide, or the like containing at least one of high melting-point materials such as Ti, Cr, W, Ta, Mo, and Pd, or a laminate thereof. In this case, a light-shielding function of the upper capacitor electrode 300a can be improved.

The lower capacitor electrode 71 is a pixel electrode side capacitor electrode which is electrically connected to the pixel electrode side source drain region 1e and the pixel electrode 9a of the TFT 30. More specifically, the lower capacitor electrode 71 is electrically connected to the pixel electrode side source drain region 1e through a contact hole 83 and also electrically connected to the relay layer 93 through a contact hole 84. In addition, the relay layer 93 is electrically connected to the pixel electrode 9a through a contact hole 85. That is, the lower capacitor electrode 71 and the relay layer 93 relay electrical connection between the pixel electrode side source drain region 1e and the pixel electrode 9a.

Though described in detail below with reference to FIGS. 6 and 7, a conductive film 410 is formed as an example of "a second conductive film" according to the invention between the pixel electrode 9a and the relay layer 93 in a laminated structure formed on the TFT array substrate 10, and electrically connected to the pixel electrode 9a and the relay layer 93 through the conductive film 410. In FIG. 4, the conductive film 410 is not illustrated for convenient explanation.

The lower capacitor electrode 71 is formed of conductive polysilicon. Accordingly, the storage capacitor 70 has a so-called MIS structure. Moreover, the lower capacitor electrode 71 has a function of a light-absorbing layer or a light-shielding film disposed between the upper capacitor electrode 300a as an upper light-shielding film and the TFT 30, as well as a function of the pixel electrode side capacitor electrode.

The storage capacitor 70 may not have the so-called MIS structure. For example, the upper capacitor electrode 300a may be formed of conductive polysilicon.

The dielectric film 75 has a signal layer structure or a multi-layer structure of, for example, a silicon oxide (SiO2) film such as an HTO (High Temperature Oxide) film or an LTO (Low Temperature Oxide) and a silicon nitride (SiN) film. In addition, the dielectric film 75 may have a single layer structure or a multi-layer structure of metallic oxide having an insulating property such as alumina or hafnia, or the like.

The lower capacitor electrode 71 may also be formed of a metal film like the upper capacitor electrode 300a. That is, the storage capacitor 70 may have a so-called MIM structure having three layers formed of a metal film, a dielectric film (insulating film), and a metal film. In this case, power consumption of the entire liquid crystal device can be reduce and a high-speed operation of elements in each of the pixels is possible at the time of driving the liquid crystal device, compared to a configuration where the lower capacitor electrode 71 is formed of conductive polysilicon or the like.

In FIG. 5, the data line 6a and the relay layer 93 are formed above the storage capacitor 70 on the TFT array substrate 10 with a second interlayer insulating film 42 interposed therebetween. The insulating film 49 is partially interposed between the interlayer insulating films 41 and 42.

Each of the data line 6a is electrically connected to the data line side source drain region 1d of the semiconductor layer 1a through a contact hole 81 formed through the first interlayer insulating film 41, the insulating film 49, the second interlayer insulating film 42. A thin film made of an Al-contained material such as Al—Si—Cu or Al—Cu is formed inside the data line 6a and the contact hole 81. Each of the data line 6a also has a function of shielding the TFT 30 from light.

On the second interlayer insulating film 42, the relay layer 93 is formed of the same film (that is, a thin film made of an Al-contained material) as that of the data line 6a. The data line 6a and the relay layer 93 are formed by forming a thin film made of an Al-contained material on the second inter-layer insulating film 42 using a thin film forming technique and partially removing the thin film, that is, performing patterning to separate them one another. Accordingly, it is possible to facilitate a process of manufacturing the liquid crystal device since the data lines 6a and the relay layers 93 are formed by the same process.

In FIG. 5, the pixel electrode 9a is formed above the data line 6a with a third interlayer insulating film 43 interposed therebetween. The third insulating film 43 is located directly under and in contact with the pixel electrode 9a. The pixel electrode 9a is electrically connected to the pixel electrode side source drain region 1e of the semiconductor layer 1a through the lower capacitor electrode 71, the contact holes 83, 84, and 85, and the relay layer 93. The contact hole 85 is formed through the third interlayer insulating layer 43 and the conductive film 410 is formed in its inner surface. A part of the pixel electrode 9a is formed to overlap with the contact hole 85 and is electrically connected to the relay layer 93 through the conductive film 410. An alignment film subjected to a predetermined alignment process such as a rubbing process is formed on an upper surface of the pixel electrode 9a.

As shown in FIG. 4, the configuration of the above-described pixel is common in all the pixels. These pixels are regularly formed in the image display area 10a (see FIG. 1).

Next, the configuration of the electrical connection between the pixel electrode and the relay layer in the above-described pixel will be described in detail with reference to FIGS. 6 and 7. FIG. 6 is an expanded view illustrating the pixel electrode and the relay layer shown in FIG. 4. FIG. 7 is a sectional view taken along the line VII-VII of FIG. 6. In FIG. 6, of the element shown in FIG. 5, the elements other than the elements related to the electrical connection between the pixel electrode 9a and the relay layer 93 are not appropriately illustrated. In FIG. 7, the elements formed below the second interlayer insulating film 42 are not illustrated.

Figure 6:
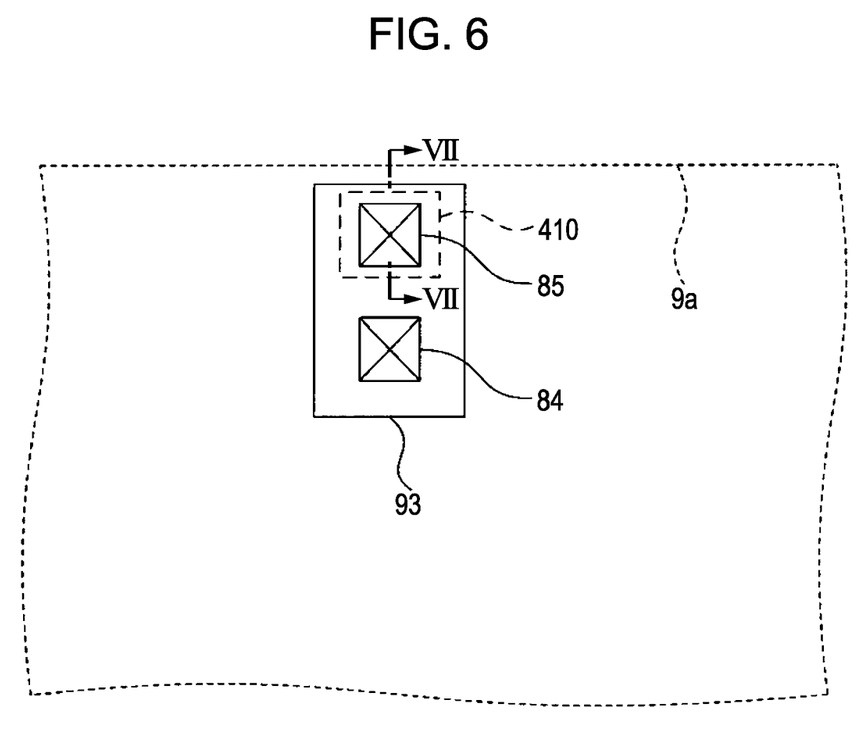
FIG. 6 is an expanded view illustrating a pixel electrode and a relay layer shown in FIG. 4.
Figure 7:
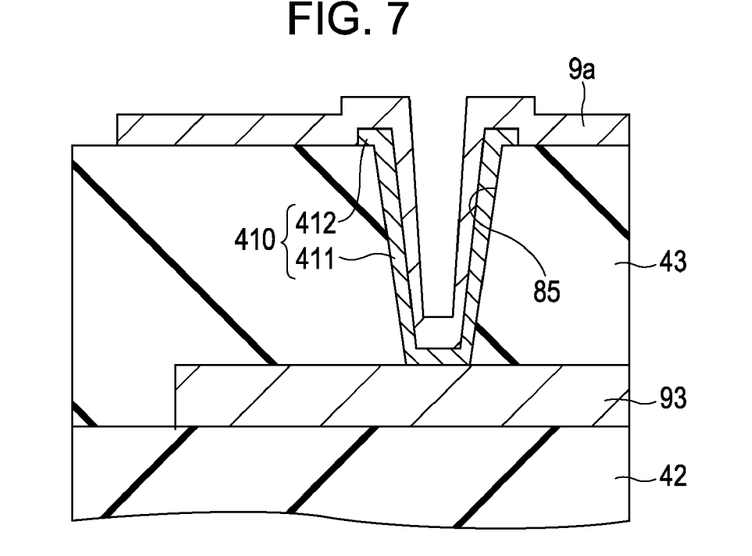
FIG. 7 is a sectional view taken along the line VII-VII of FIG. 6.

In FIGS. 6 and 7, the relay layer 93 is formed of a thin film made of an Al-contained material on the second interlayer insulating film 42. The pixel electrode 9a is formed above the relay layer 93 with the third interlay insulating film 43 interposed therebetween. The pixel electrode 9a is electrically connected to the relay layer 93 through the contact hole 85 formed in the third insulating film 43.

In FIGS. 6 and 7, in this embodiment, the conductive film 410 is particularly formed below the pixel electrode 9a and above the third interlayer insulating film 43 so as to overlap with the contact hole 85 in an island shape in plan view from the TFT array substrate 10. The conductive film 410 is formed of a TiN (titanium nitride) film. The conductive film 410 includes a body portion 411 formed in an inner surface of the contact hole 85 and an extension portion 412 extending outside the contact hole 85 from the body portion 411. The conductive film 410 is not limited to a TiN film, but may be formed of a single film using a W (tungsten) film, a WSi (tungsten silicon) film, or a Ti (titanium), or formed of a multi-layer film containing at least one of a TiN film, a W film, the WSi film, and a Ti film.

The pixel electrode 9a and the relay layer 93 are electrically connected to each other through the conductive film 410 without directly connecting them one another. That is, the pixel electrode 9a and the relay layer 93 are electrically connected to each other by directly connecting the pixel electrode 9a to the conductive film 410 and directly connecting the conductive film 410 to the relay layer 93. Accordingly, by forming the conductive film 410 formed of a TiN film, it is possible to prevent occurrence of electrolytic corrosion caused due to the direct connection between the pixel electrode 9a formed of an ITO film and the relay layer 93 formed of an Al-contained thin film. That is, the conductive film 410 can function as a film for preventing electrolytic corrosion between the pixel electrode 9a and the relay layer 93.

As shown in FIG. 6, in this embodiment, the conductive film 410 is particularly formed so as to overlap with the contact hole 85 in the island shape in plan view from the TFT array substrate 10. Accordingly, it is possible to prevent heat generation caused due to light incident on the conductive film 410 formed of a TiN film, compared to, for example, a case where a TiN film is formed so as to overlap with the entire relay layer 93 (in other words, the relay layer 93 has a multi-layer structure where a layer formed of a TiN film is formed on a layer made of an Al-contained material).

As shown in FIG. 7, in this embodiment, the conductive film 410 is particularly formed below the pixel electrode 9a and above the third interlayer insulating film 43. Accordingly, in the manufacturing process, it is possible to reduce or prevent the occurrence of electrolytic corrosion between the pixel electrode 9a and the relay layer 93, which is caused due to the fact that the pixel electrode 9a and the relay layer 93 are directly connected to each other by performing an unnecessary etching process on the relay layer 93 when the conductive film 410 is subjected to patterning by etching the third interlayer insulating film 43.

Figure 8:
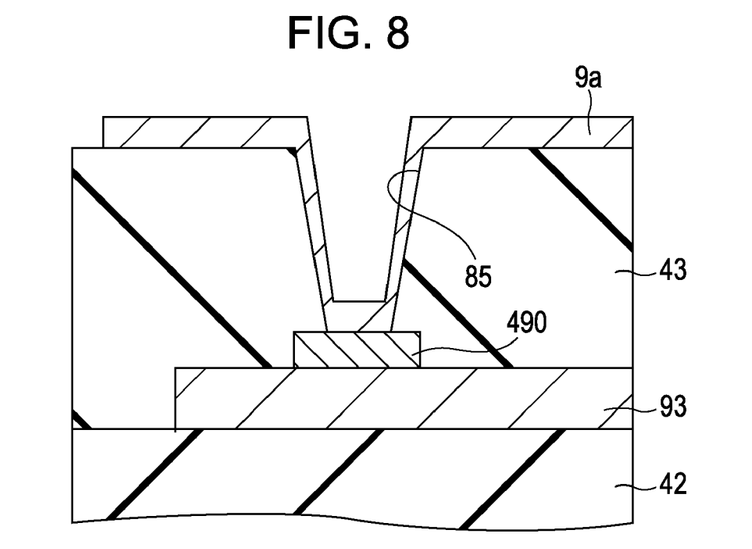
FIG. 8 is a sectional view illustrated to describe the same object as that in FIG. 7 as a comparison example.

FIG. 8 is a sectional view illustrated to describe the same object as that in FIG. 7 as a comparison example. A liquid crystal device according to the comparison example has a different configuration from that of the liquid crystal device according to this embodiment in that a conductive film 490 is provided instead of the conductive film 410, and has the same configuration as that of the liquid crystal device according to this embodiment except for the different configuration.

As shown as the comparison example in FIG. 8, the conductive film 490 formed of a TiN film functions as an electrolytic corrosion preventing film. When the conductive film 490 is formed below the third interlayer insulating film 43 and on the relay layer 93 so as to overlap with the contact hole 85 in an island shape in plan view, the contact hole 85 is formed by etching the third interlayer insulating film 43 after the conducive film 490 is formed. In this case, it is necessary to make the conductive film 490 relatively thick in order to prevent the etching of the conductive film 490 from being excessively performed up to the relay layer 93.

However, in this embodiment, the conductive film 410 formed of a TiN film is provided below the pixel electrode 9a and above the third interlayer insulating film 43. Accordingly, in the manufacturing process, the contact hole 85 is formed by etching the third interlayer insulating film 43 before the conductive film 410 is formed. As a result, it is possible to further suppress heat generation caused due to the light incident on the conductive film 410 formed of a TiN film, since the thickness of the conductive film 410 formed of a TiN film can be made small, compared to the conductive film 490 formed of a TiN film which is shown as the comparison example in FIG. 8.

As described above, in the liquid crystal device according to this embodiment, it is possible to prevent electrolytic corrosion from occurring between the pixel electrode 9a and the relay layer 93. Moreover, it is possible to suppress heat generation caused due to the light incident on the conductive film 410 formed of a TiN film. As a result, a high-quality image can be displayed.

Figure 9:
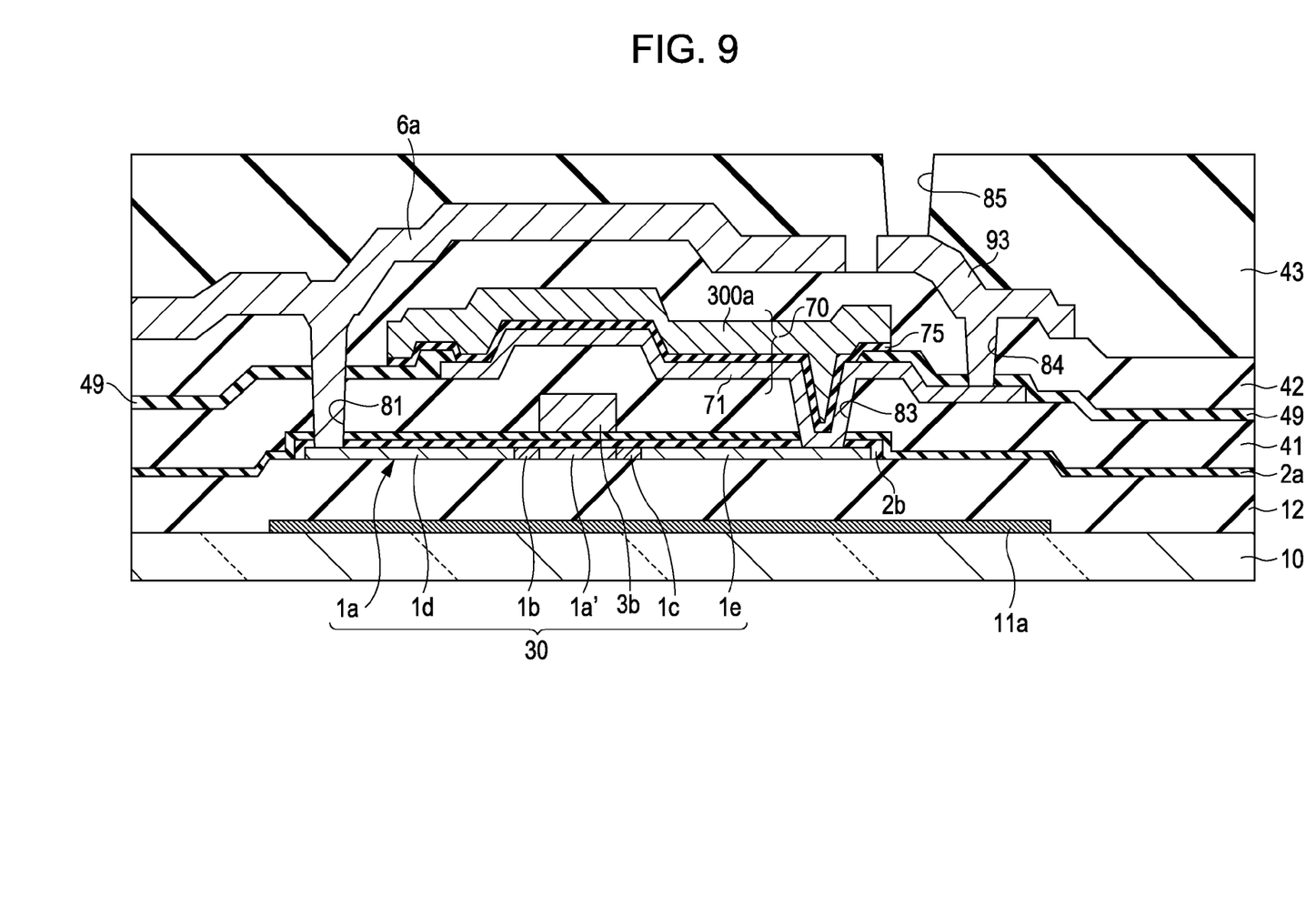
FIG. 9 is a process diagram (first process diagram) illustrating a process of manufacturing the liquid crystal device according to the first embodiment.

Next, a method of manufacturing the liquid crystal device according to the above-described embodiment will be described with reference to FIGS. 9 and 10. FIGS. 9, 10A, and 10B are process diagrams illustrating processes of manufacturing the liquid crystal device according to this embodiment. FIG. 9 is illustrated in correspondence with the sectional view shown in FIG. 5 and FIGS. 10A and 10B are illustrated in correspondence with the sectional view in FIG. 7. Hereinafter, a process of forming each of the conductive films 410 of the liquid crystal device according to this embodiment will be mainly described.

First, in the process shown in FIG. 9, the lower light-shielding film 11a having a predetermined pattern is formed on the image display area 10a on the TFT array substrate 10, by laminating single metal, alloy, metal silicide, poly silicide, or the like containing at least one of high melting-point materials such as Ti, Cr, W, Ta, and Mo, or a laminate thereof. At this time, the lower light-shielding film 11a is generally formed in a lattice shape so as to have a portion overlapping with the TFT 30 to be formed in a predetermined pattern.

Subsequently, the ground insulating film 12 is formed on the entire surface of the TFT array substrate 10. The ground insulating film 12 is formed of, for example, a silicate glass film such as NSG, PSG, or BSG, a silicon nitride film, or a silicon oxide film using a TEOS (Tetra Ethyl Ortho Silicate) gas, a TEB (Tetra Ethyl Borate) gas, a TMOP (Tetra Methyl Oxy Phoslate) gas, or the like by a normal pressure CVD method, a reduced-pressure CVD method, or the like. In addition, after the formation of the ground insulating film 12, the surface of the ground insulating film 12 may be subjected to a planarization process such as CMP (Chemical Mechanical Polishing) process. Subsequently, the TFT 30 re formed at each of intersections of the data lines 6a and the scanning lines 3a as gate electrodes. In addition, in the process of forming the TFTs 30, a normal semiconductor integrating technique may be used. In addition, in the process of forming the TFTs 30, it is possible to improve a characteristic of the TFTs 30 by performing a heat treatment such as an annealing treatment.

Subsequently, the first interlayer insulating film 41 is formed on the entire surface of the TFT array substrate 10. The first interlayer insulating film 41 is formed of a silicate glass film such as NSG, PSG, or BSG, a silicon nitride film, or a silicon oxide film using a TEOS gas, a TEB gas, a TMOP gas, or the like by a normal pressure CVD method, a reduced-pressure CVD method, or the like. Subsequently, etching is performed at a predetermined position of the surface of the first interlayer insulating film 41 to form the contact hole 83 which reaches the pixel electrode side source drain region 1e.

Subsequently, a conductive polysilicon film is laminated in a predetermined pattern to form the lower capacitor electrode 71. The lower capacitor electrode 71 is connected to the pixel electrode side source drain region 1e by one connection point through the contact hole 83. Subsequently, the insulating film 49 is laminated on the first interlayer insulating film 41 and the lower capacitor electrode 71. Subsequently, an opening is formed so as to expose the lower capacitor electrode 71 by laminating a resist layer having a predetermined pattern on the insulating film 49 and etching the resist layer. At this time, the forming of the opening is performed so that a portion of the insulating film 49 remains on the lower capacitor electrode 71. By forming such an insulating film 49, it is possible to prevent undesired current leak from occurring between an end face of the lower capacitor electrode 71 and an end face of the upper capacitor electrode 300a, since it is possible to enlarge an interlayer distance between the end face of the lower capacitor electrode 71 and the end face of the upper capacitor electrode 300a to be formed later, compared to a case where the insulating film 49 is not formed. Subsequently, the dielectric film 75 having a predetermined pattern is formed of, for example, a SiO2 film or a SiN film. Subsequently, the storage capacitor 70 is formed by laminating an Al film on the dielectric film 75 and forming the upper capacitor electrode 300a (in other words, the capacitor line 300 (see FIG. 4)) having a predetermined pattern.

Subsequently, the second interlayer insulating film 42 is laminated on the entire surface of the TFT array substrate 10. Then, etching is performed at a predetermined position of the surface of the TFT array substrate 10 to form the contact holes 81 and 84.

Subsequently, each of the data lines 6a and the relay layer 93 are formed on the second interlayer insulating film 42. Each of the data lines 6a is connected to the data line side source drain region 1d by one connection point through the contact hole 81 formed through the insulating film 49 and the interlayer insulating films 41 and 42. The relay layer 93 is connected to the lower capacitor electrode 71 by one connection point through the contact hole 84. Subsequently, the third interlayer insulating film 43 is laminated on the entire surface of the TFT array substrate 10. Then etching is performed at a predetermined position of the surface of the TFT array substrate 10 to form the contact hole 85.

Figure 10A:
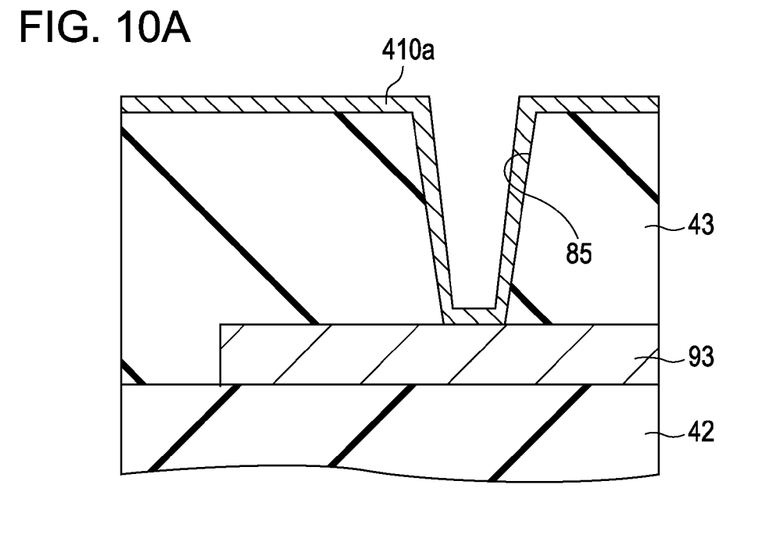
FIGS. 10A and 10B are process diagrams (second process diagram) illustrating a process of manufacturing the liquid crystal device according to the first embodiment.

Next, in the process shown in FIG. 10A, a conductive film 410a which is a precursor film of the conductive film 410 (see FIG. 5) is formed on the entire surface of the TFT array substrate 10. The conductive film 410a is formed of a TiN film by, for example, a plasma CVD method.

Figure 10B:
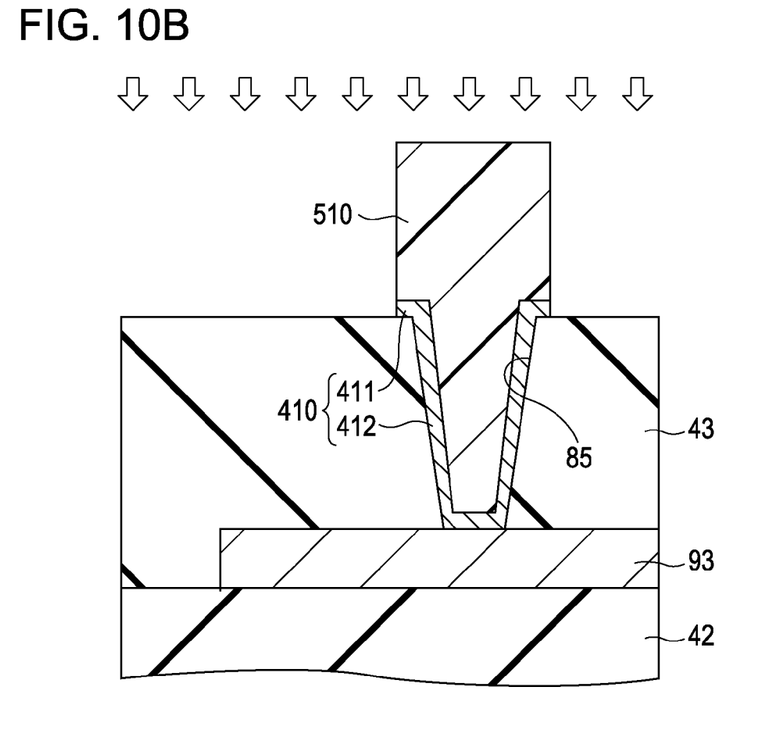

Next, in the process shown in FIG. 10B, a resist layer 510 having a predetermined pattern is formed on the conductive film 410a, and then the conductive film 410a is subjected to an etching process (in the figure, shown by a downward arrow) such as a dry etching process using, for example, a mixed gas of CF4 (tetra-fluoromethane) and O2 (oxygen) or a mixed gas of CHF3 (tri-fluoromethane), CF4, and Ar (argon) through the resist film 510. In this way, the conductive film 410 is formed in the island shape in every contact hole 85. At this time, the conductive film 410 is formed so as to include the body portion 411 formed in the inner surface of the contact hole 85 and the extension portion 412 extending outside the contact hole 85 from the body portion 411. In this case, the extension portion 412 is located above the surface of the third interlayer insulating film 43. Accordingly, even though the extension portion 412 is subjected to an unnecessary etching process from the outer edge toward the inside, the relay layer 93 is not exposed from the conductive film 410.

Subsequently, in FIG. 5, an ITO film is formed on the entire surface of the third interlayer insulating film 43 by a sputter treatment or the like, and then each of the pixel electrodes 9a is formed at a predetermined position of the surface of the third interlayer insulating film 43 by etching. Each of the pixel electrodes 9a is electrically connected to the relay layer 93 by the conductive film 410 through the contact hole 85.

According to the above-described method of manufacturing the liquid crystal device, it is possible to manufacture the liquid crystal device according to the above-described embodiment. In particular, it is possible to prevent the occurrence of electrolytic corrosion between the pixel electrode 9a and the relay layer 93 and suppress heat generation caused due to the light incident on the conductive film 410 formed of a TiN film, since the conductive film 410 formed of a TiN film is provided above the third interlayer insulating film 43 so as to overlap with the contact hole 85 formed in the third interlayer insulating film 43 in plan view from the TFT array substrate 10. Moreover, it is possible to easily perform precise patterning the conductive film 410 formed of a TiN film.

Electronic Apparatus

Figure 11:
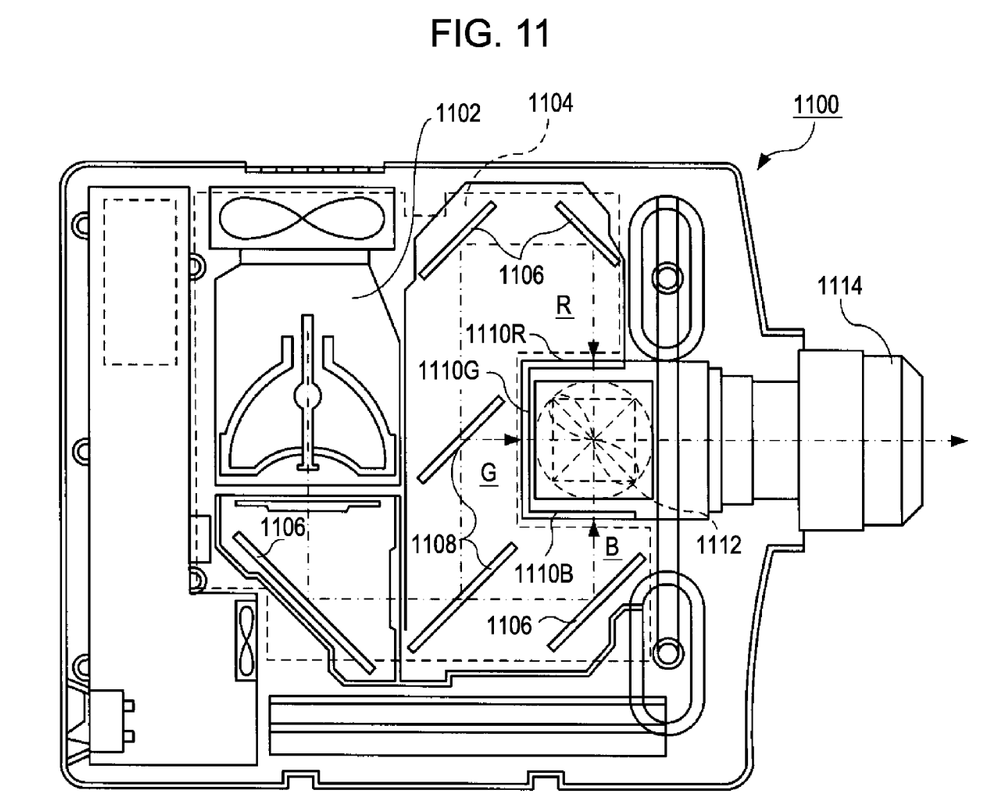
FIG. 11 is a plan view illustrating a configuration of a projector which is an example of an electronic apparatus to which an electro-optic device is applied.

Next, a case where the above-described liquid crystal device as an electro-optic device is applied to various electronic apparatuses will be described. Hereinafter, a projector in which the liquid crystal device is used as a light valve will be described. FIG. 11 is a plan view illustrating a configuration example of the projector.

As shown in FIG. 11, a lamp unit 1102 of a white light source, such as a halogen lamp, is provided inside a projector 1100. Projection light emitted from the lamp unit 1102 divided into the three primary color beams of R, G, and B by four mirrors 1106 and two dichroic mirrors 1108 disposed inside a light guide 1104, and the three primary color beams are incident on liquid crystal panels 1110R, 1110B, and 1110G as light valves corresponding to the three primary colors, respectively.

A configuration of the liquid crystal panels 1110R, 1110B, and 1110G is the same as that of the above-described liquid crystal device. The liquid crystal panels 1110R, 1110B, and 1110G are driven in accordance with primary color signals of R, G, and B supplied from image signal processing circuits, respectively. Light modulated by the liquid crystal panels is incident on a dichroic prism 1112 from three directions. In the dichroic prism 1112, the color beams of R and B are refracted at 90° and the color beam of G goes straight. Accordingly, images of the respective colors are synthesized to be projected onto a screen or the like through a projection lens 1114.

As for images displayed by the liquid crystal panels 1110R, 1110B, and 1110G, it is necessary to reverse the images displayed by the liquid crystal panels 1110R and 1110B in a symmetrical mirror shape respective to the image displayed by the liquid crystal panel 1110G.

Since respective light corresponding to the three primary colors of R, G, and B is incident onto the liquid crystal panels 1110R, 1110B, and 1110G by the dichroic mirrors 1108, it is not necessary to provide a color filter.

In addition to the electronic apparatus described with reference to FIG. 11, examples of the electronic apparatus include a mobile type personal computer, a cellular phone, a liquid crystal TV, a view finder type or monitor direct view-type video tape recorder, a car navigation apparatus, a pager, an electronic pocket book, a calculator, a word processor, a work station, a television phone, a POS terminal, an apparatus having a touch panel, and the like. In addition, the liquid crystal device can also be applied to such various electronic apparatuses.

In addition to the liquid crystal device described in the above-described embodiment, certain embodiments can apply to a reflective liquid crystal display device (LCOS) a plasma display panel (PDP), a field emission display (FED and SED), an organic EL display, a digital micro-mirror device (DMD), an electrophoresis apparatus, and the like in which elements are formed on a silicon substrate.

The invention is not limited to the above-described embodiment, but may be appropriately modified in various forms without departing from the gist and spirit of the invention which can be understood from the appended claims and the whole specification. Therefore, it can be understood that an electro-optical device including such modifications, a method of manufacturing the electro-optical device, and an electronic apparatus employing the electro-optical device are included in the technique scope of the invention.

What is claimed is:

1. An electro-optic device comprising:
   a data line extending in a first direction;
   a scanning line extending in a second direction and intersecting the data line;
   a pixel electrode disposed so as to correspond to intersection regions of the data line and the scanning line;
   a first insulating film that is provided directly below the pixel electrode, the first insulating film including a first contact hole;
   a second insulating film that is provided directly below the first insulating film, the second insulating film including a second contact hole which is offset from the first contact hole in plan view;
   a first conductive film that is electrically connected to the pixel electrode through a relay layer formed in the second contact hole, the relay layer being electrically connected to the first conductive film and to the pixel electrode via the first contact hole in the first insulating film; and
   a second conductive film interposed between the relay layer and the first insulating film, the second conductive film having an island shape that overlaps with the first contact hole in plan view,
   wherein the data line and the relay layer are both formed directly on the same surface of the second insulating film and from the same material.

2. The electro-optic device according to claim 1, wherein the second conductive film is formed of a material containing at least one of tungsten, tungsten silicon, titanium nitride, and titanium.

3. The electro-optic device according to claim 1,
   wherein the pixel electrode is formed of an ITO film, and
   wherein the first conductive film is formed of a material containing aluminum.

4. The electro-optic device according to claim 1, wherein the second conductive film includes a body portion formed in an inner surface of the first contact hole and an extension portion extending outside the first contact hole from the body portion.

5. An electronic apparatus comprising the electro-optic device according to claim 1.

* * * * *